US010127507B2

(12) United States Patent
Lavrov et al.

(10) Patent No.: US 10,127,507 B2
(45) Date of Patent: Nov. 13, 2018

(54) PROJECT MANAGEMENT SYSTEM PROVIDING INTERACTIVE ISSUE CREATION AND MANAGEMENT

(71) Applicant: LATISTA Technologies, Inc., Reston, VA (US)

(72) Inventors: Andrei Lavrov, Chevy Chase, MD (US); Anatoliy Tishin, Reston, VA (US); Patricia Remacle, Reston, VA (US); Christopher Ramsey, New York, NY (US)

(73) Assignee: Latista Technologies, Inc., Reston, VA (US)

( * ) Notice: Subject to any disclaimer, the term of this patent is extended or adjusted under 35 U.S.C. 154(b) by 876 days.

(21) Appl. No.: 14/592,144

(22) Filed: Jan. 8, 2015

(65) Prior Publication Data

US 2015/0193711 A1 Jul. 9, 2015

Related U.S. Application Data

(60) Provisional application No. 61/925,464, filed on Jan. 9, 2014.

(51) Int. Cl.
*G06Q 10/06* (2012.01)
*G06F 17/00* (2006.01)
*G06F 17/30* (2006.01)

(52) U.S. Cl.
CPC . *G06Q 10/06313* (2013.01); *G06F 17/30091* (2013.01)

(58) Field of Classification Search
CPC .............. G06Q 10/06313; G06F 17/30091
See application file for complete search history.

(56) References Cited

U.S. PATENT DOCUMENTS

| | | | | |
|---|---|---|---|---|
| 5,828,774 A | * | 10/1998 | Wang | ........................ G06T 5/50 |
| | | | | 382/128 |
| 6,628,285 B1 | * | 9/2003 | Abeyta | ................. G06F 3/0481 |
| | | | | 345/441 |
| 7,831,628 B1 | | 11/2010 | Silva et al. | |
| 8,548,992 B2 | | 10/2013 | Abramoff et al. | |
| 8,583,462 B2 | | 11/2013 | Podgurny et al. | |
| 8,700,310 B2 | | 4/2014 | Jayanthi | |
| 8,732,125 B2 | | 5/2014 | Omansky et al. | |
| 9,916,538 B2 | * | 3/2018 | Zadeh | .................... G06K 9/627 |

(Continued)

OTHER PUBLICATIONS

Defining a Linear View for a PDF Form, dated Sep. 11, 2014, pp. 1-2, LATISTA Server Edition On-line Help, LATISTA Technologies, Reston, Virginia.

(Continued)

*Primary Examiner* — Sujay Koneru
(74) *Attorney, Agent, or Firm* — Kraguljac Law Group, LLC

(57) ABSTRACT

Systems and methods are described for providing interactive issue creation and management for use in project management processes. The system provides users with mechanisms for creating fully-featured, easy-to-identify, and highly legible issues, with a visual mechanism for communicating issue information between the parties involved in the project management process, thereby resulting in improved tracking to ensure issues are appropriately addressed and timely resolved, saving time and money.

20 Claims, 10 Drawing Sheets

(56) References Cited

U.S. PATENT DOCUMENTS

| | | | |
|---|---|---|---|
| 2002/0054059 A1* | 5/2002 | Schneiderman | G06F 17/241 715/700 |
| 2007/0083517 A1 | 4/2007 | Prince et al. | |
| 2007/0192155 A1* | 8/2007 | Gauger | G06Q 10/00 705/301 |
| 2007/0288842 A1* | 12/2007 | Averitt | G06F 17/5004 715/210 |
| 2007/0296735 A1* | 12/2007 | Ishikawa | G06F 17/30265 345/619 |
| 2008/0062195 A1* | 3/2008 | Brown | G06F 17/50 345/619 |
| 2008/0069428 A1* | 3/2008 | Schulkin | G01B 11/24 382/141 |
| 2008/0276159 A1* | 11/2008 | Narayanaswami | G06F 17/241 715/202 |
| 2009/0177995 A1* | 7/2009 | Gould | G06F 3/04855 715/786 |
| 2010/0077316 A1* | 3/2010 | Omansky | G06Q 10/10 715/751 |
| 2010/0082842 A1* | 4/2010 | Lavrov | G06F 17/30241 709/248 |
| 2011/0093619 A1 | 4/2011 | Nelson | |
| 2011/0169826 A1* | 7/2011 | Elsberg | G06T 15/005 345/419 |
| 2012/0066178 A1* | 3/2012 | Omansky | G06F 17/5004 707/626 |
| 2012/0116728 A1* | 5/2012 | Shear | G06F 17/50 703/1 |
| 2012/0159351 A1* | 6/2012 | Bell | G06F 3/01 715/753 |
| 2012/0306749 A1* | 12/2012 | Liu | G06F 3/0488 345/163 |
| 2012/0310906 A1* | 12/2012 | Miller | G06F 17/5004 707/695 |
| 2013/0090965 A1 | 4/2013 | Rivere | |
| 2013/0138606 A1* | 5/2013 | Kahle | G06F 17/30129 707/609 |
| 2013/0179354 A1 | 7/2013 | Seat | |
| 2013/0235029 A1 | 9/2013 | Keough et al. | |
| 2013/0304533 A1 | 11/2013 | Nudd et al. | |
| 2013/0338971 A1 | 12/2013 | Chao et al. | |
| 2014/0019148 A1* | 1/2014 | Buzz | G06Q 10/06 705/1.1 |
| 2014/0039955 A1 | 2/2014 | Lee et al. | |
| 2014/0089794 A1* | 3/2014 | Huang | H04L 67/06 715/704 |
| 2014/0278267 A1* | 9/2014 | Buzz | G06F 17/5004 703/1 |
| 2014/0278703 A1* | 9/2014 | Owens, Jr. | G06Q 10/06313 705/7.23 |
| 2016/0063087 A1* | 3/2016 | Berson | G06Q 30/0259 707/740 |

OTHER PUBLICATIONS

Babak Jalalzadeh Fard, Construction smart forms: an application of information technology to reduce waste by increasing interoperability, dated Jan. 1, 2011, pp. 1-137, Civil Engineering Master's These, Northeastern University, Boston, Massachusetts.

Ibrahiem Abdul Razak Alani et al., Artificial Intelligence Expert System for Minimizing Sold Waste During Highway Construction Activities, dated Mar. 18, 2009, pp. 1-4, Proceedings of the International MultiConference of Engineers and Computer Scientest 2009 vol. I IMECS, Hong Kong, China.

LATISTA Commissioning Mobile and Cloud Feature Overview, dated Feb. 21, 2013, all screens of video, LATISTA Software, Video available at http://www.youtube.com/watch?v=WOym6ngHKj8.

LATISTA Visual Punch List or Punch on Plan Features Overview, dated Feb. 21, 2013, all screens of video, YouTube, LATISTA Software, Video available at http://www.youtube.com/watch?v=9pX_FoGdVwg.

LATISTA Brings BIM to the Field, dated Dec. 5, 2013, all screens of video, LATISTA Software, Video available at http://www.forconstructionpros.com/video/11267932/video-lastista-brings-bim-to-the-field and http://www.youtube.com/watch?v=GOdDoyre_QU.

International Search Report, dated Mar. 17, 2015, pp. 1-2, International Application No. PCT/US2014/070519, International Search Authority—U.S.

* cited by examiner

PROJECT MANAGEMENT SYSTEM PROVIDING INTERACTIVE ISSUE CREATION AND MANAGEMENT

CROSS REFERENCE TO RELATED APPLICATIONS

This application claims priority to provisional application Ser. No. 61/925,464, filed 9 Jan. 2014, which is incorporated by reference in its entirety.

FIELD

The present disclosure relates generally to project management, and, more particularly, to systems and methods for providing interactive issue creation and management for use in project management processes.

BACKGROUND

In general, project management is understood to include planning, organizing, motivating, and controlling resources to achieve specific goals. In the construction industry, for example, construction management firms may be engaged in medium and large projects (e.g., sport stadiums, hospitals and healthcare facilities, office buildings, power plants, manufacturing facilities, airports, seaports and railway terminals, subway systems, multi-unit residential complexes, etc.). Throughout the entire process of construction (e.g., from planning to handover), large teams of construction professionals and specialists have to be managed so as to ensure that all aspects of the construction project (e.g., partnering, estimating, purchasing, scheduling, engineering, safety, community relations, etc.) go smoothly to produce high-quality projects on time.

Conventionally, coordinating such large teams involved a lot of paperwork, including documentation related to data in the field. This is especially true in performing field management, punch list management, quality, commissioning, turn-over and safety management, and warranty- and maintenance-related functions. Such documents include, but are not limited to, field inspections, punch lists, vendor lists, resource lists, completion lists, and task lists. Consequently, firms have sought processes that keep their project coordinators and subcontractors on the job site working (i.e., building and maintaining), rather than in an office shuffling papers. Furthermore, the use of documentation may slow down productivity simply due to the fact that not all of the field personnel may have access to the recorded field data, thus possibly leading to work duplication, unnecessary communications, or other cost-increasing problems.

For example, in the construction industry, personnel may spend a significant amount of time documenting existing or potential problems, non-compliances, discrepancies, variances or other issues that arise while carrying out certain project management processes (e.g., field inspection, quality control, commissioning, etc.). The documented issues are addressed and resolved before the project is completed and turned over to the owner or client. Generally, issues must be documented in detail so as to ensure that they are correctly resolved on a first attempt. Multiple attempts of correcting an issue (also referred to herein as "rework") can cost valuable time and money, possibly up to 20% or more of a project's contract amount. A well-documented issue may contain a variety of informative details, including, but not limited to, a defined location or area in which the issue was found, an annotated project rendering (e.g., drawing) providing more detail about the issue's location, a clear description of what the issue is (e.g., in the form of notes), an identified responsible party tasked with resolving the issue, and additional details providing clarity to the issue.

Creating and documenting an issue with a sufficient amount of detail is time- and resource-intensive, which ultimately leads to personnel providing incomplete documentation, thus increasing the likelihood that the issue will not be fixed properly or in a timely manner. Furthermore, the primary and most popular method involves judicious use of clipboards, pens, and paper to document issues in conjunction with painter's tape physically marking the location of the issues in the real world. Spreadsheets of punch list items may then be created and sorted between responsible parties. Distributing this information to the responsible parties who need to resolve the issue is often manually handled. In some instances, spreadsheets may be emailed to different team members, making it difficult to track the issue, as well as the status of the issue (e.g., whether the issue is resolved, in process, or waiting to be processed). In turn, current methods do not provide a comprehensive audit trail of when the issue was communicated to the responsible party, the current status of the issue, and whether the resolution time (time in which the issue was resolved) is acceptable. As such, current methods of creating issues and managing resolution of such issues are inefficient, thereby resulting in increased costs, time delays, as well as potential risks of injury in the event that certain issues are not resolved in a timely manner.

SUMMARY

The present disclosure concerns systems and methods for construction field management. In one aspect, a system is configured to provide field management services and facilitate an online platform web-application for carrying out one or more functions related to construction field management. The system is configured for use by capital business owners, commissioning agents, and construction management firms and their subcontractors/vendors for management of the construction project, wherein the application optimizes a variety of field operations, improving performance and effectiveness of mobile workers.

The system generally includes one or more mobile devices configured to communicate with a remote server or cloud-based service. The mobile devices may generally include any mobile computing device configured to run the construction field management software thereon. For example, a mobile device consistent with the present disclosure may include a tablet PC for field-based personnel configured to synchronize with the server and/or cloud-based server and dynamically exchange field data related to one or more construction processes. Each mobile device may communicate with one another, by way of the server and/or cloud-based server, such that each field-personnel has access to ongoing constructions processes and related field data.

The mobile devices may be synchronized with the server and/or cloud-based service on a regular basis to make data records consistent and up-to-date. In a synchronization process, data record changes may be propagated from one mobile device to another, via the server or cloud-based service. In one aspect, such synchronization is based on a data record replication mechanism where all the necessary data records are transmitted to mobile devices in advance. The replication mechanism then assumes that all the mobile device users may work "off-line" and go "on-line" only to connect to a server to "sync." Mobile device users may modify or delete existing data records and add new data records to the replicated data records in the course of their field work. All user-made modifications and replication of new data records may take place during next synchronization. Synchronization also may be used to initialize any newly-installed mobile device version of the application.

In one aspect, the system may include a field management system for executing the application, wherein the field management system may be implemented on each mobile device and/or the server and/or cloud-based service. The field management system includes an issue creation and management module for generally allowing a user to create one or more issue mark-ups on a project rendering (e.g., drawing, model, etc.) in the field during certain project management processes (e.g., field inspection, quality control, commissioning, punch list review, etc.). An issue mark-up may generally be understood to refer to any indicium that makes note of, highlights, or otherwise calls out a problem, issue or concern and/or any changes or revisions that may require resolution or correction.

In particular, the field management system includes a project viewer module configured to provide a user with a means for displaying a project rendering, such as a drawing, on the mobile device. The issue creation and management module is configured to allow a user to create one or more issue mark-ups on the displayed drawing, each issue mark-up containing sufficient details associated with an issue. For example, on a construction project, such as a building, issue mark-ups created may include a variety of informative data associated with the issue, including, but not limited to, issue type, the defined area of the building in which the issue can be found, user input data, such as annotations, provided on the building drawing so as to provide greater detail regarding the issue, including specific notes and/or images and/or voice recordings, a description of the issue, an identified party responsible for addressing and resolving the issue, and issue status.

In some embodiments, the issue creation and management module may provide a user with customizable standard issue templates to choose from when creating issue mark-ups, wherein the templates represent issues or problems most often encountered on the job site, and further contain pre-defined informative data, such as issue descriptions and responsible parties. Accordingly, rather than manually create most, if not all, of the issue mark-ups, a user need only select an appropriate standard issue template while interacting with the drawing so as to create an issue mark-up at a selected location on the drawing. In turn, the issue creation and management module is configured to automatically create an issue mark-up at the selected area on the drawing and further include the informative data associated with the selected issue template. The user may then include additional data, such as annotations on the drawing. Furthermore, the user may attach an image associated with the issue mark-up, such as an image of the real-world component, system, structure, etc. that requires fixing.

Upon creating an issue mark-up on the drawing, the issue creation and management module is further configured to store each issue mark-up as a separate layer of the project drawing. By storing each issue mark-up as an independent layer, the system allows a user to view each issue mark-up individually or view multiple issue mark-ups simultaneously when viewing the project drawing or preparing drawing markups for a responsible party. For example, a user may create multiple issue mark-ups on the same project drawing. However, displaying every issue mark-up may be distracting and present challenges in finding, correcting, and closing the issues in a timely manner. Accordingly, the system further provides users with a means of sorting or filtering the display of issue mark-ups on the project drawing, wherein a user may filter issue mark-ups based on the informative data, such that issue mark-ups can be displayed based on issue type, issue area, responsible party, issue status, etc.

The issue mark-ups, as well as marked up drawings, may be stored in the cloud-based service to share with other users on their respective mobile devices, thereby allowing other distributed users to view issue mark-ups of project drawings. Accordingly, upon accessing marked up drawings, the issue mark-ups are visible to other users and can be relied upon so as to ensure the building project is going as planned.

Furthermore, every issue mark-up created may be subject to a pre-defined workflow specific to the issue's type or category. The systems allow a user to customize the issue process by defining a custom list of statuses that the issue will flow through and transitions that will move an issue from one status to the next. Accordingly, the system allows generation of a user-defined process-driven workflow. This ensures that issues are moved through the workflow in an orderly and efficient fashion, that all steps and involved parties are documented accurately, and that no issue is missed, saving projects time and money while reducing the risk of safety violations and poor construction.

Systems and methods consistent with the present disclosure provide an optimized and intuitive means of creating and managing issues during project management processes, particularly when performed on a user's device in the field. The system allows users to quickly and efficiently create well-documented issues. Furthermore, by storing each issue mark-up as a separate layer on the same file (e.g., project drawing), the system avoids treating each marked-up project drawing as a separate file, thus saving space and improving a user's interaction with the system, allowing users to filter and sort issues in an efficient manner and keep project drawings uncluttered. Furthermore, the system provides users with a means for creating fully-featured, easy-to-identify, and highly legible issues, thereby resulting in improved tracking to ensure issues are appropriately addressed and timely resolved, saving time and money.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION

Figure 1:
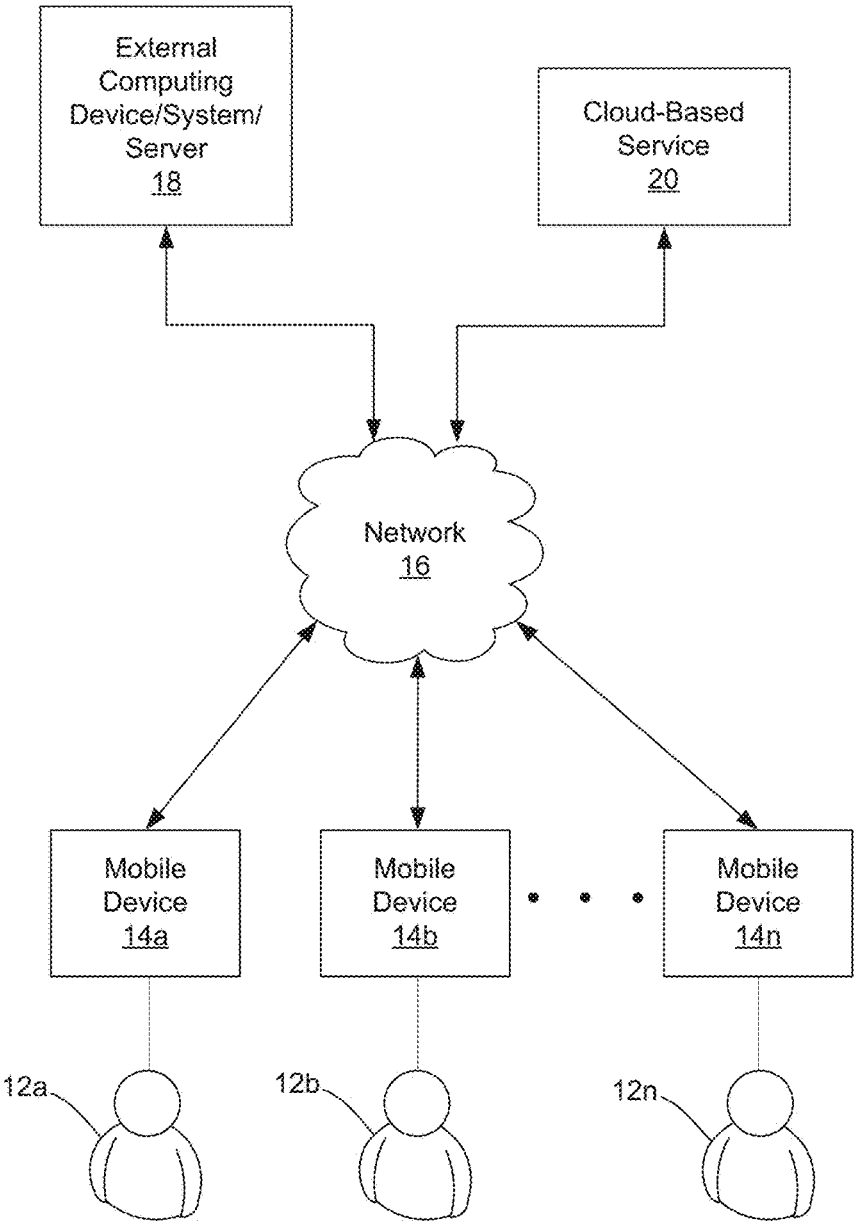
FIG. 1 is a block diagram illustrating one embodiment of an exemplary system for providing field management services and facilitating an online platform web-application for carrying out one or more functions related to construction field management.

By way of overview, the present disclosure is generally directed to systems and methods for field management of projects. The projects may vary widely in nature, and as just a few examples may include construction projects; manufacturing and maintenance; mining, oil, and gas exploration, drilling, and delivery, or any other project for which compliance of the project is desired with respect to industry, government, or other regulations, standards, or guidelines. In some embodiments, the system is configured to provide field management services and facilitate an online platform web-application for carrying out one or more functions related to construction field management. The system is configured for use by capital business owners, commissioning agents and construction management firms and their subcontractors/vendors for management of the construction project. The system is configured to optimize a variety of field operations, improving performance and effectiveness of mobile workers.

The system generally includes one or more mobile devices configured to communicate with a remote server or cloud-based service. The mobile devices may generally include any mobile computing device configured to run the construction field management software thereon. For example, a mobile device consistent with the present disclosure may include a tablet PC for field-based personnel configured to synchronize with the server and/or cloud-based server and dynamically exchange field data related to one or more construction processes. Each mobile device may communicate with one another, by way of the server and/or cloud-based server, such that each field-personnel has access to ongoing constructions processes and related field data.

The mobile devices may be synchronized with the server and/or cloud-based service on a regular basis to make data records consistent and up-to-date. In a synchronization process, data record changes may be propagated from one mobile device to another, via the server or cloud-based service. In one aspect, such synchronization is based on a data record replication mechanism where all the necessary data records are transmitted to mobile devices in advance. The replication mechanism then assumes that all the mobile device users may work "off-line" and go "on-line" to connect to a server to "sync." Mobile device users may modify or delete existing data records and add new data records to the replicated data records in the course of their field work. All user-made modifications and replication of new data records may take place during next synchronization. Synchronization also may be used to initialize any newly-installed mobile device version of the application.

In one embodiment, the system may include a field management system for executing the application. The field management system may include modules for such important areas of Quality Management, Punch List Management, Safety Management, Items (e.g., Inventory) Management, Production Tracking, Commissioning, Document Management, Report Management, and Issue Creation and Management. The field management system may be implemented on each mobile device and/or the server and/or cloud-based service.

The issue creation and management module of the field management system generally allows a user to create one or more issue mark-ups on a project rendering (e.g., drawing, model, etc.) in the field during certain project management processes (e.g., field inspection, quality control, commissioning, punch list review, etc.). An issue mark-up may generally be understood to refer to an indication of sorts that makes note of, highlights, or otherwise calls out a problem, issue or concern and/or any changes or revisions that may require resolution or correction.

In particular, the issue creation and management module is configured to allow a user to create one or more issue mark-ups on a displayed project drawing, for example, each issue mark-up containing details associated with an issue. For example, on a construction project, such as a building, issue mark-ups may include a variety of informative data associated with the issue, including, but not limited to, issue type, the defined area of the building in which the issue can be found, user input data, such as annotations, provided on the building drawing so as to provide greater detail regarding the issue, including specific notes and/or images and/or voice recordings, a description of the issue, an identified party responsible for addressing and resolving the issue, and issue status.

In some embodiments, the issue creation and management module may provide a user with customizable standard issue templates to choose from when creating issue mark-ups, wherein the templates represent issues or problems most often encountered on the job site, and further contain predefined informative data, such as issue descriptions and responsible parties. Accordingly, rather than manually create most, if not all, of the issue mark-ups, a user need only select an appropriate standard issue template while interacting with the drawing so as to create an issue mark-up at a selected location on the drawing. In turn, the issue creation and management module is configured to automatically create an issue mark-up at the selected area on the drawing and further include the informative data associated with the selected issue template. The user may then include additional data, such as annotations on the drawing. Furthermore, the user may attach an image associated with the issue mark-up, such as an image of the real-world component, system, structure, etc. that requires fixing.

Upon creating an issue mark-up on the drawing, the issue creation and management module is further configured to store each issue mark-up as a separate layer of the project drawing. Each layer may be an object or a combination of objects in a database. Each object may be, for example, a table in a relational database, an object in an object database, a node in an XML database, or any other type of database object. Markups produced during inspections, for example, may be associated at the database level with a corresponding layer through one-to-one or one-to-many database relationships. By storing each issue mark-up as an independent layer, the system allows a user to view each issue mark-up individually or view multiple issue mark-ups simultaneously when viewing the project drawing. For example, a user may create multiple issue mark-ups on the same project drawing. However, displaying every issue mark-up may be distracting and present challenges in finding, correcting, and closing the issues in a timely manner. Accordingly, the system further provides users with sorting or filtering the display of issue mark-ups on the project drawing, wherein a user may filter issue mark-ups based on filter parameters, e.g., informative data, such that issue mark-ups can be displayed based on issue type, issue area, responsible party, issue status, voice annotation, image annotation, video annotation, issue severity, issue duration, etc.

The issue mark-ups, as well as marked up drawings, may be stored in the cloud-based service to share with other users on their respective mobile devices, thereby allowing other distributed users to request the mark-ups from the cloud and view issue mark-ups of project drawings. Accordingly, upon accessing marked up drawings, the issue mark-ups are visible to other users and can be relied upon so as to ensure the building project is going as planned.

Furthermore, every issue mark-up created may be subject to a pre-defined workflow specific to the issue's type or category. The systems are configured to allow a user to customize the issue process by defining a list of statuses that the issue will flow through and transitions that will move an issue from one status to the next. Accordingly, the system allows generation of a user-defined process-driven workflow. This ensures that issues are moved through the workflow in an orderly and efficient fashion, that all steps and involved parties are documented accurately, and that no issue is missed, saving projects time and money while reducing the risk of safety violations and poor construction.

In another aspect, systems and methods may provide a user with a means for generating and executing a workflow when performing one or more project management processes, such as a commissioning process for one or more components of a system. It should be noted, however, that systems and methods for generating a workflow consistent with the present disclosure may be used in conjunction with the issue mark-ups described in greater detail herein, such that resolution of such issue mark-ups is dictated by such workflows described herein. The main objective of commissioning is to effect the safe and orderly handover of a project (e.g., building) from the constructor to the owner, guaranteeing its operability in terms of performance, reliability, safety and information traceability. Additionally, when executed in a planned and effective way, commissioning normally represents an essential factor for the fulfillment of schedule, costs, safety and quality requirements of the project.

As such, during the commissioning process, it is important to have a defined workflow so as to ensure that the commissioning process is carried out in an orderly and efficient fashion, which may ultimately save time and money, as well as reduce risk of injury when testing certain systems or equipment. For example, during the commissioning process of a new building, a commissioning coordinator may want to ensure that certain criteria are met, in a particular order, before a subsequent commissioning test is performed. This is particularly important when performing a commissioning process on systems that may pose an inherent risk of injury or death.

For example, in the case of the testing electrical equipment, the commissioning coordinator wants to ensure that personnel do not attempt to run a functional test on a piece of electrical equipment unless such equipment has first successfully passed an Electrical Safety Inspection. Otherwise, personnel may be exposed to risk of electrocution. Furthermore, a commissioning coordinator may also wish to enforce specific conditions before declaring that certain milestones have been met during the commissioning process. For example, prior to declaring a Clean Room "Room Ready", any and all operational issues identified during the commissioning tests have to be resolved.

The commissioning module of the field management system, which may be implemented on each mobile device and/or the server and/or cloud-based service, includes a workflow management module configured to generate and execute a process-driven workflow list based on user input. The workflow management module is configured to allow a user to customize the commissioning process by way of user-generated workflow list. In particular, the workflow management module is configured to allow a user to map one or more steps/tests to a specific component of a system (e.g., component of a piece of electrical equipment). The workflow management module is further configured to allow a user to assign dependencies for one or more of the mapped steps, including start criteria, which define which steps must be successfully completed before a subsequent step can begin, and completion criteria, which define what type of issues must be completely resolved before a certain step (or milestone) can be completed.

The systems and methods consistent with the present disclosure provide an intuitive means of implementing a process-driven workflow during a commissioning process. The system allows generation of a user-defined process-driven workflow, which includes user-assigned dependencies. A workflow generated with systems and methods consistent with the present disclosure will generally ensure that the commissioning process is carried out in an orderly and efficient fashion, ensuring that certain criteria are met, in a particular order, before a subsequent commissioning step is performed, which will save time and money, as well as reduce the risk of injury when testing certain systems or equipment.

Turning to FIG. 1, one embodiment of an exemplary system for providing field management services is generally illustrated. FIG. 1 presents an exemplary environment diagram 10 of various hardware components and other features. As shown, data and other information and services are, for example, input by one or more users 12 (shown as users 12a-12n) and received by one or more associated mobile devices 14 (shown as mobile devices 14a-14n). The mobile devices 14 are configured to be communicatively coupled to an external device, system or server 18 and/or cloud-based service 20 via a network 16. In addition, or alternatively, the mobile devices 14 are configured to be communicatively coupled to one another via the network 16.

The mobile devices 14 may be embodied as any type of device for communicating with one or more remote devices/systems/servers and for performing the other functions described herein. For example, the mobile device 14 may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a network appliance, a web appliance, a distributed computing system, a multiprocessor system, a processor-based system, a consumer electronic device, and/or any other computing device configured to store and access data, and/or to execute software and related applications consistent with the present disclosure.

In one aspect, mobile device 14 is a one of many commercially-available tablet PCs, notebook PCs, or convertible notebook PCs. Any of a wide range of mobile device may be used. As just a few examples, the mobile device may be an Android, iOS, or WP based smartphone; an Android or iOS based tablet computer, or any other portable device. The mobile device may be suitable for a construction jobsite where shock, extreme heat, cold, direct sunlight, dust, and rain are expected. Rugged, semi-rugged, and non-rugged tablet PCs—such as the Panasonic Toughbook, the Itronix GoBook, the Motion-Computing F5 and the Xplore Technologies iX104C2—typically offer the ability to enter data using an electronic pen, built-in software keyboard, regular external keyboard, mouse and voice dictation, and may be equipped with a digital camera. Such tablet PCs typically include the ability to program pen-activated shortcuts for complex information entry as in, for example, filling out an electronic form or report. Accordingly, systems and methods described herein, particularly the online platform web-application, are compatible with mobile operating systems (OS) for PC-based mobile devices, including, but not limited to, Android, Windows, and Blackberry. In one embodiment, the mobile device 14 may include a Windows Tablet running Windows 8 OS.

In other embodiments, the mobile device 14 is computer tablet having touchscreen capabilities. As one example, the mobile device 14 may be an Apple IPAD® device, or an Android based device. Accordingly, the systems and methods described herein may execute on and may be configured to be compatible with Apple operating systems (OS), including iOS 7, 8, as well as prior and later versions, Windows OSs, Android OS, or any other OSs.

It should be understood that the term "data" means any information used in an aspect. Examples include, but are not limited to, input data by users, task data, checklist data, punch list data, standard templates or other standard information, standard report elements, data records, alerts and messages, system overhead information or other internal communications, etc.

The external computing device/system/server 18 may be embodied as any type of device, system or server for communicating with the mobile devices 14 and/or the cloud-based service 20, and for performing the other functions described herein. Examples embodiments of the external computing device/system/server 18 may be identical to those just described with respect to the mobile device 14 and/or may be embodied as a conventional server, e.g., web server or the like.

The network 16 may represent, for example, a private or non-private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the mobile devices 14, between the mobile devices 14 and the external computing device/system/server 18 and/or cloud-based service 20, may be, in whole or in part, a wired connection.

The network 16 may be any network that carries data. Non-limiting examples of suitable networks that may be used as network 16 include Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, Near Field Communication (NFC), other networks capable of carrying data, and combinations thereof. In some embodiments, network 16 is chosen from the internet, at least one wireless network, at least one cellular telephone network, and combinations thereof. As such, the network 16 may include any number of additional devices, such as additional computers, routers, and switches, to facilitate communications. In some embodiments, the network 16 may be or include a single network, and in other embodiments the network 16 may be or include a collection of networks.

Figure 2:
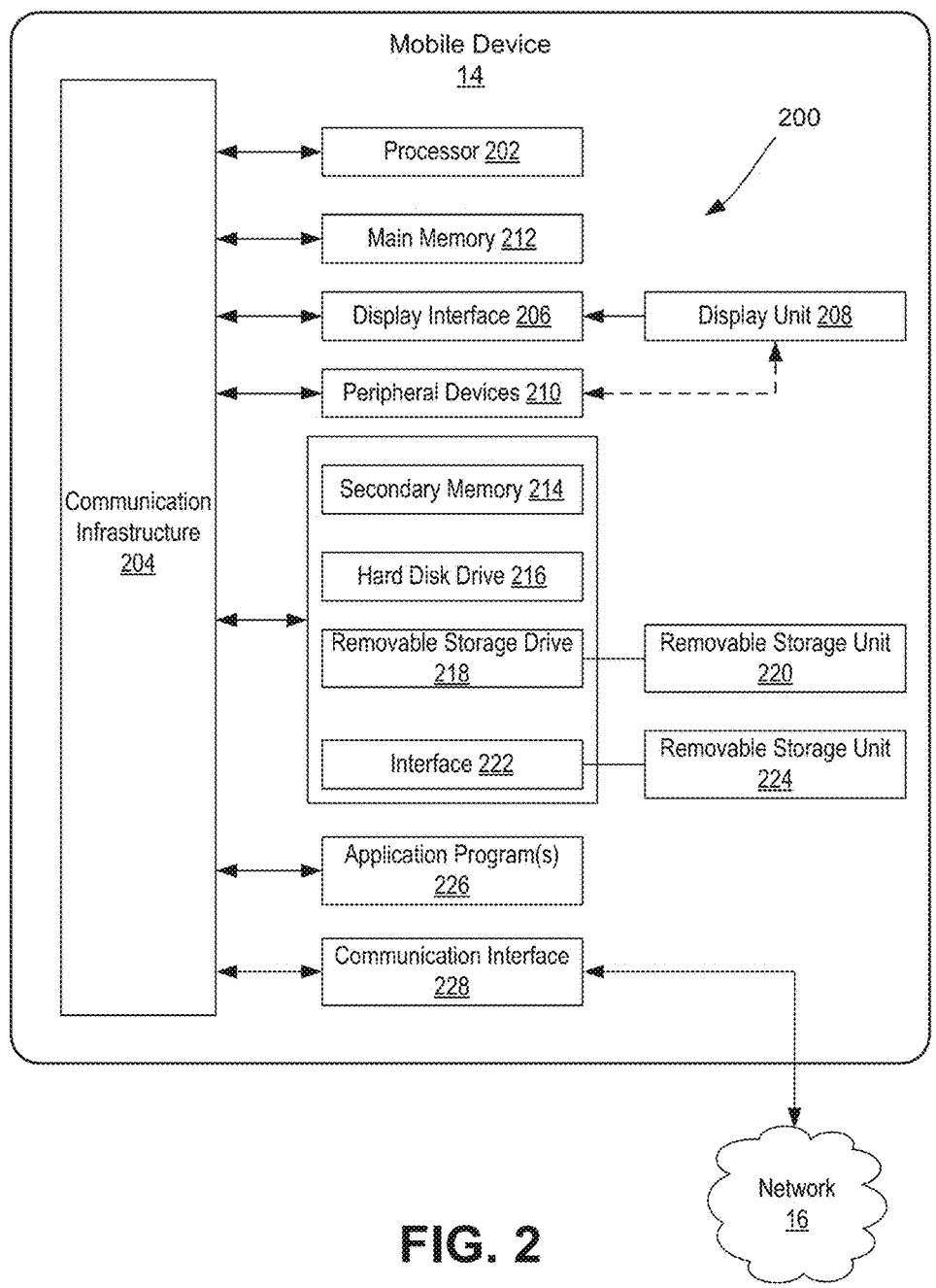
FIG. 2 is a block diagram illustrating at least one embodiment of a mobile device of the system of FIG. 1 consistent with the present disclosure.

As described in greater detail herein, a computing system (see FIG. 2) may be configured to carry out the functionality described herein (e.g., field management services and facilitation of software for carrying out one or more functions related to construction field management). In one embodiment, one or more computing systems are configured to carry out the functionality described herein. An example of a computer system 200 is shown in FIG. 2. The computing system 200 of FIG. 2 may be included within the mobile device 14, for example. Additionally, or alternatively, the computing system 200 may be included within the external computing device/system/server 18 and/or cloud-based service 20. The computing system 200 includes one or more processors, such as processor 202. Processor 202 is operably connected to communication infrastructure 204 (e.g., a communications bus, cross-over bar, or network). Various software aspects are described in terms of this exemplary computer system The computing system 200 may include display interface 206 that forwards graphics, text, and other data from communication infrastructure 204 (or from a frame buffer not shown) for display on display unit 208. The computing system further includes peripheral devices 210. The peripheral devices 210 may include one or more devices for interacting with the mobile device 14, such as a keypad, microphone, camera, one or more audio speakers, and other sensors. In one embodiment, the display unit 208 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the mobile device 14, such as accessing and interacting with applications executed on the device 14.

The computing system 200 also includes main memory 212, such as random access memory (RAM), and may also include secondary memory 214. The main memory 212 and secondary memory 214 may be embodied as any type of device or devices configured for short-term or long-term storage of data such as, for example, memory devices and circuits, memory cards, hard disk drives, solid-state drives, or other data storage devices. In the illustrative embodiment, the mobile device 14 may maintain one or more application programs, databases, media and/or other information in the main and/or secondary memory 212, 214. The secondary memory 214 may include, for example, a hard disk drive 216 and/or removable storage drive 218, representing a floppy disk drive, a magnetic tape drive, an optical disk drive, etc. Removable storage drive 218 reads from and/or writes to removable storage unit 220 in any known manner. The removable storage unit 220 may represents a floppy disk, magnetic tape, optical disk, etc. which is read by and written to by removable storage drive 218. As will be appreciated, removable storage unit 220 includes a computer usable storage medium having stored therein computer software and/or data.

In alternative embodiments, the secondary memory 214 may include other similar devices for allowing computer programs or other instructions to be loaded into the computing system 200. Such devices may include, for example, a removable storage unit 224 and interface 222. Examples of such may include a program cartridge and cartridge interface (such as that found in video game devices), a removable memory chip (such as an erasable programmable read only memory (EPROM), or programmable read only memory (PROM)) and associated socket, and other removable storage units 224 and interfaces 222, which allow software and data to be transferred from removable storage unit 224 to the computing system 200.

The computing system 200 may also include one or more application programs 226 directly stored thereon. The application program(s) 226 may include any number of different software application programs, each configured to execute a specific task related to field management. For example, the application program 226 may include construction field management software for providing field management services and facilitating an online platform web-application for carrying out one or more functions related to construction field management.

As described in greater detail herein, in one embodiment, the application program 226 may include project viewing software configured to display a project rendering (e.g., drawing, blueprint, building information model (BIM), project related documents, etc.) for display on the display unit 208 and further allow user interaction with the project rendering. The project viewing software may be compatible with other existing programs or software. Accordingly, the project viewing software of the present disclosure is configured to receive and convert existing project data (e.g., created three-dimensional (3D) BIM models) from other programs and further render the received data into compatible rendering on the mobile device 14, such that users in the field can view, manipulate, and work directly with the project rendering in the field.

The computing system 200 may also include a communications interface 228. The communications interface 228 is configured to allow data to be transferred between the computing system 200 and external devices (other mobile devices 14, external computing device/system/server 18, cloud-based service 20). Examples of communications interface 228 may include a modem, a network interface (such as an Ethernet card), a communications port, a Personal Computer Memory Card International Association (PCMCIA) slot and card, etc.

Computer programs (also referred to as computer control logic) may be stored in main memory 212 and/or secondary memory 214 or a local database on the mobile device 14. Computer programs may also be received via communications interface 228. Such computer programs, when executed, perform the features discussed herein. In particular, the computer programs, including application programs 226, when executed, perform the features described. Accordingly, such computer programs represent controllers of computer system 200.

In one embodiment implemented using software, the software may be stored in a computer program product and loaded into the computing system 200 using removable storage drive 218, hard drive 216 or communications interface 228. The control logic (e.g., software), when executed by processor 202, causes processor 202 to perform the functions described herein.

Another embodiment uses hardware components such as application specific integrated circuits (ASICs). Implementation of the hardware state machine so as to perform the functions described herein will be apparent to persons skilled in the relevant art(s).

In yet another embodiment, a combination of both hardware and software implements the functions described.

Figure 3:
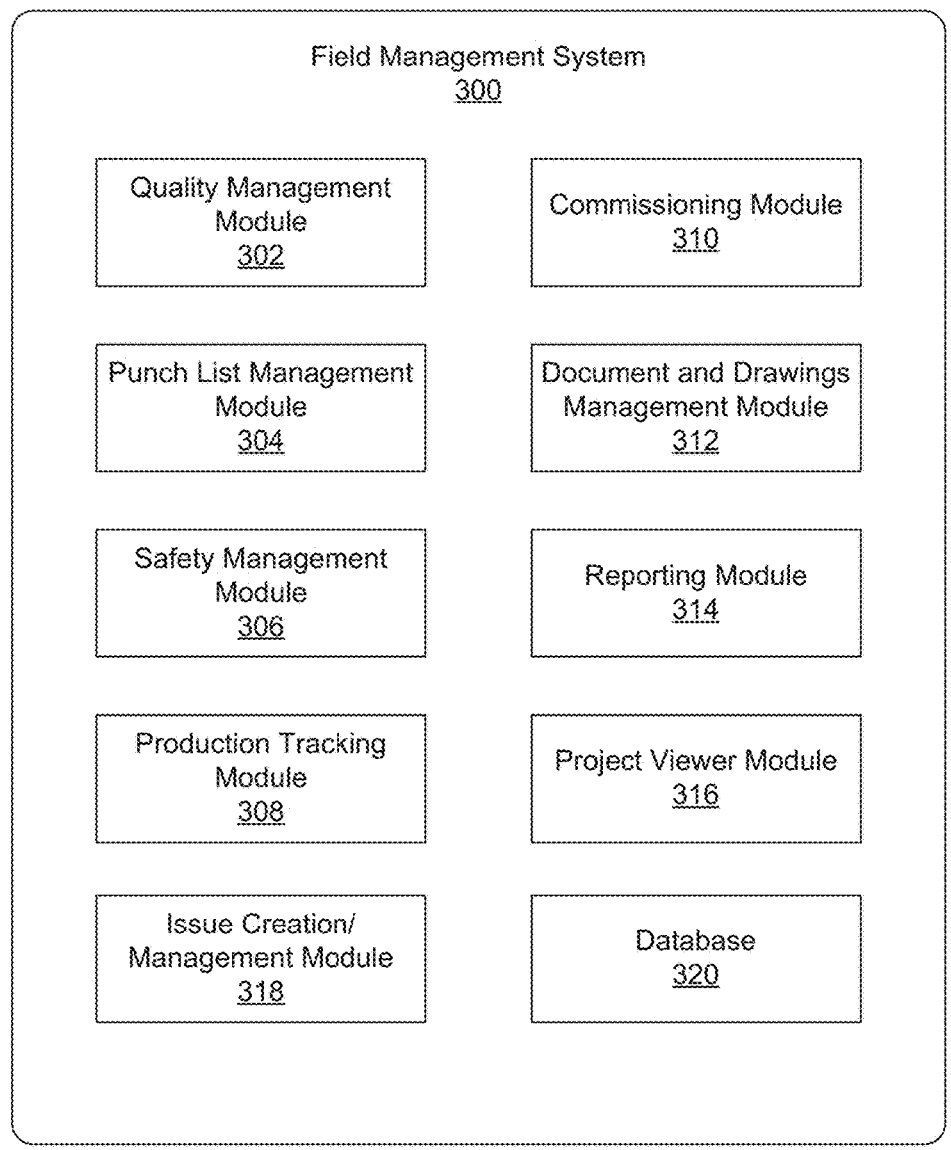
FIG. 3 is a block diagram illustrating an exemplary embodiment of a field management system for providing mobile-based field management services and communication between the mobile devices and the external computing device/system/server and/or the cloud-based service of FIG. 1.

Referring to FIG. 3, an exemplary embodiment of a field management system 300 is generally illustrated. The field management system 300 is configured to generally provide one or more field management services, including, but not limited to, issue tracking, field reporting, materials tracking, safety, quality assurance (QA) and quality control (QC), work list, commissioning, punch list, production tracking, and document and drawings management. Accordingly, the field management system 300 may include a quality management module 302, punch list management module 304, safety management module 306, production tracking module 308, commissioning module 310, document and drawings management module 312, reporting module 314, project viewer module 316, and issue creation and management module 318. Each of the modules 302-318 is configured to provide users, when executing the software application, access to and exchange of field data in conjunction with the desired process. The field management system 300 further includes a database 320 for storing resources related to each of the field management services. The resources may include, but are not limited to, checklists, checkboxes, descriptions, data items, information templates, equipment lists, report templates, histories, images, etc.

The field management system 300 is generally configured to communicate and operate in conjunction with the computing system 200 of FIG. 2. Accordingly, in some embodiments, the field management system 300 is incorporated within the mobile devices 14. Additionally, or alternatively, the field management system 300 may be part of the external device, system or server 18 and/or cloud-based service 20.

Figure 4:
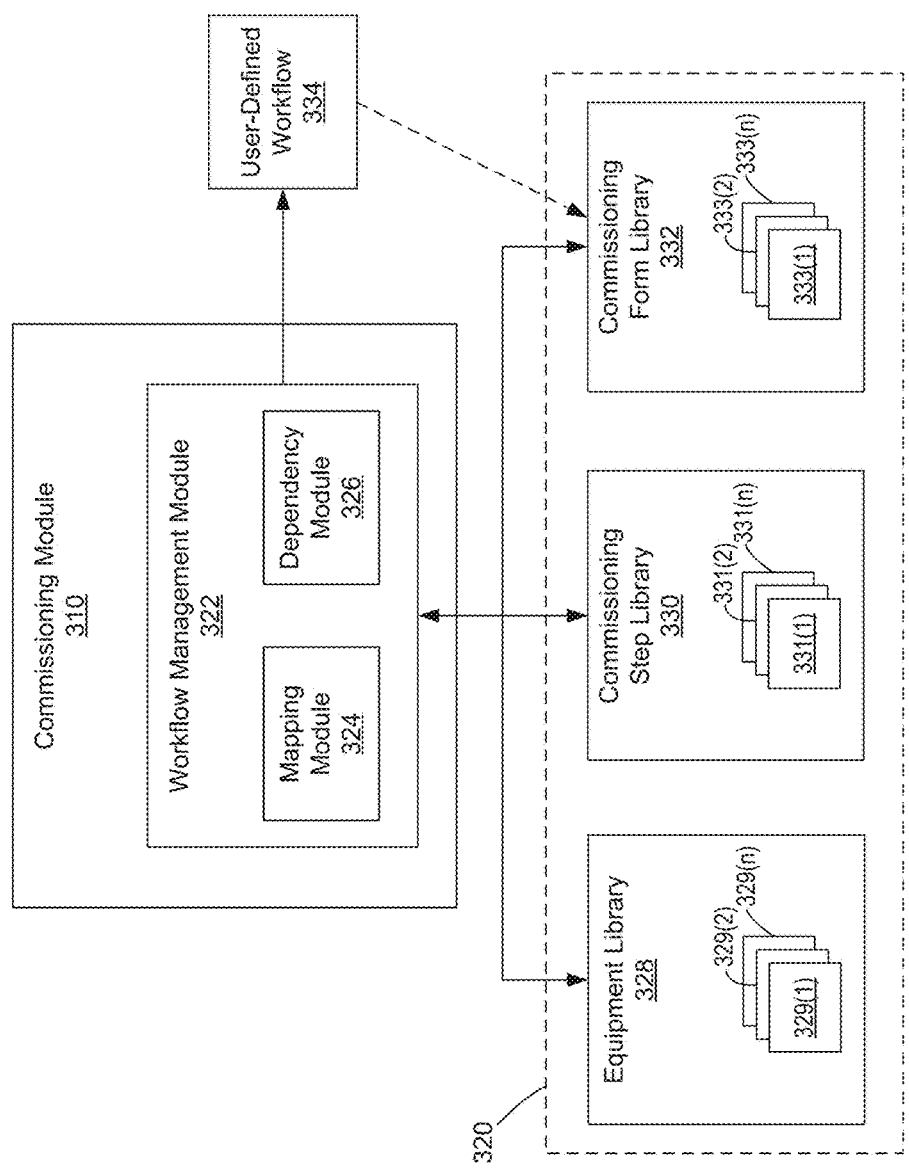
FIG. 4 is a block diagram illustrating a portion of the field management system of FIG. 3 in greater detail.

FIG. 4 is a block diagram illustrating the commissioning module 310 of the field management system 300 of FIG. 3 in greater detail. As shown, the commissioning module 310 includes a workflow management module 322 configured to generate a user-defined process-driven workflow 334 based on input from a user 12, generally in control of and/or having responsibility for overseeing and managing one or more field management services. For example, systems and methods consistent with the present disclosure may allow a commissioning coordinator to create a specific workflow of any particular component of a system, such as an electrical system within a newly construction building. The workflow management module 322 is generally configured to allow the coordinator to set up the commissioning process, specifically the workflow of the commissioning process. Generation of a user-defined workflow 334 is generally performed on the server side of the system, wherein the user-defined workflow 334, once created, can then be synchronized with one or more of the mobile devices 14, thereby allowing the enforcement of the user-defined workflow 334 for a specific component or system on the mobile devices 14.

In the illustrated embodiment, the workflow management module 322 includes a mapping module 324 and a dependency module 326. As described in greater detail herein, the mapping module 324 is configured to allow the coordinator to map a specific component (e.g. piece of equipment) of a system to undergo the commissioning process with a specific step (e.g., functional test), in a particular order, so as to generally create a workflow that dictates progression of the commissioning process as a whole. The dependency module 326 generally allows the coordinator to optionally define dependencies between steps. The dependencies may include, for example, start criteria, which defines which steps must be successfully completed before a subsequent step can begin, and completion criteria, which defines what type of issues must be completely resolved before a certain step (or milestone) can be completed. Accordingly, during the commissioning process of electrical equipment, for example, the user-defined process-driven workflow may ensure that that personnel do not attempt to run a functional test on a piece of electrical equipment unless such equipment has first successfully passed an Electrical Safety Inspection, as dictated by the dependencies assigned to the specific step, as described above. Upon mapping steps to components and generating step/component pairs and optionally further assigning dependencies for the steps, the workflow management module 326 generates a user-defined process-driven workflow 334 to generally dictate the process of the commissioning process.

As shown in FIG. 4, a commissioning coordinator may access one or more libraries containing data stored in the database 320, for example, for use in creating a user-defined workflow for any given commissioning process. In particular, the coordinator may have access to a plurality of equipment profiles 329(1)-329(n) stored in an equipment library 328, a plurality of steps 331(1)-331(n) stored in a commissioning step library 330, and a plurality of interactive commissioning forms 333(1)-333(n) stored in a commissioning form library 332. Generally, the coordinator may first define a series of commissioning steps (e.g. tests) for any particular commissioning process. Accordingly, the coordinator utilizes one or more steps 331 from the commissioning step library 330 for any particular system to be commissioned, including the individual components of such system. At this point, the coordinator may also define dependencies between the steps, such as start criteria and/or completion criteria.

The coordinator may then access and design one or more interactive commissioning forms 333 from library 332. The interactive forms 333 are used to capture the results of each commissioning step in a workflow on the mobile device 14. The interactive form 333 may include, for example, a GUI presented on a display of a mobile device 14 and mimic a paper document generally used in the commissioning process. However, the interactive form 333 allows input by way of touchscreen and further provides functions not otherwise available on a paper document (e.g., filter and sorting, task data, image presentation, real-time updating, etc.). As an example, a user conducting a Functional Test on an electrical piece of equipment will record the results on an Electrical Test form and an individual conducting a Functional Test (step) on a mechanical piece of equipment will record results on a Mechanical Test form. These two forms are created in as interactive forms so they can be filled out electronically on the mobile device 14.

The coordinator may further access a plurality of components 329 from the equipment library 328. In one embodiment, the system may be configured to allow the coordinator to define an hierarchal equipment structure, or tree, related to a systems that require commissioning. For example, the coordinator may define a hierarchal equipment tree representing rooms > systems within the rooms > components which make up the systems (i.e., that require commissioning). For each entry in the equipment tree, the coordinator can define which steps 331 in the commissioning process must be completed. In particular, the mapping module 324 is configured to assign one or more steps 331 to a particular component 329, thereby creating step(s)/component pairings. For instance, a Clean Room may go through only Construction Complete and Room Ready but an individual component may require Design Verification, Construction Complete, Electrical Safety Inspection, Functional Test, and Emergency Test. Furthermore, for each step(s)/component pairing, the mapping module 324 is further configured to allow the coordinator to define a form 333 to be used on the particular component 329.

In some instances, the equipment library 328 may include a large amount of data (e.g., thousands of pieces of equipment 329) from which the coordinator may choose. Likewise, the coordinator may have a large number of steps 331 to choose from and assign with each piece of equipment 329. Accordingly, generation of a user-defined workflow 334 can be quite extensive, as systems and methods consistent with the present disclosure are configured to handle large amounts of data, including the large number of different variations for generating a user-defined workflow 334. Accordingly, to simplify the setup, systems and methods consistent with the present disclosure provide the ability to setup templates for different types of equipment that can be setup once and then applied to multiple items in the equipment tree. For example, a coordinator may set up a particular workflow template any given piece of equipment. The workflow template may include specific steps, optionally including dependencies between one or more of the steps, and the particular interactive form to be used. For example, a coordinator may set up a template for Air Handling Units that define what steps must be conducted on an AHU and further define what forms must be used for each step. The template may be saved (e.g., stored in the database 324) and may be applied to AHU1-AHU100 (assuming there are a hundred in the building) in future commissioning processes when needed. Thus, a coordinator need not create a new workflow each time.

Figure 5:
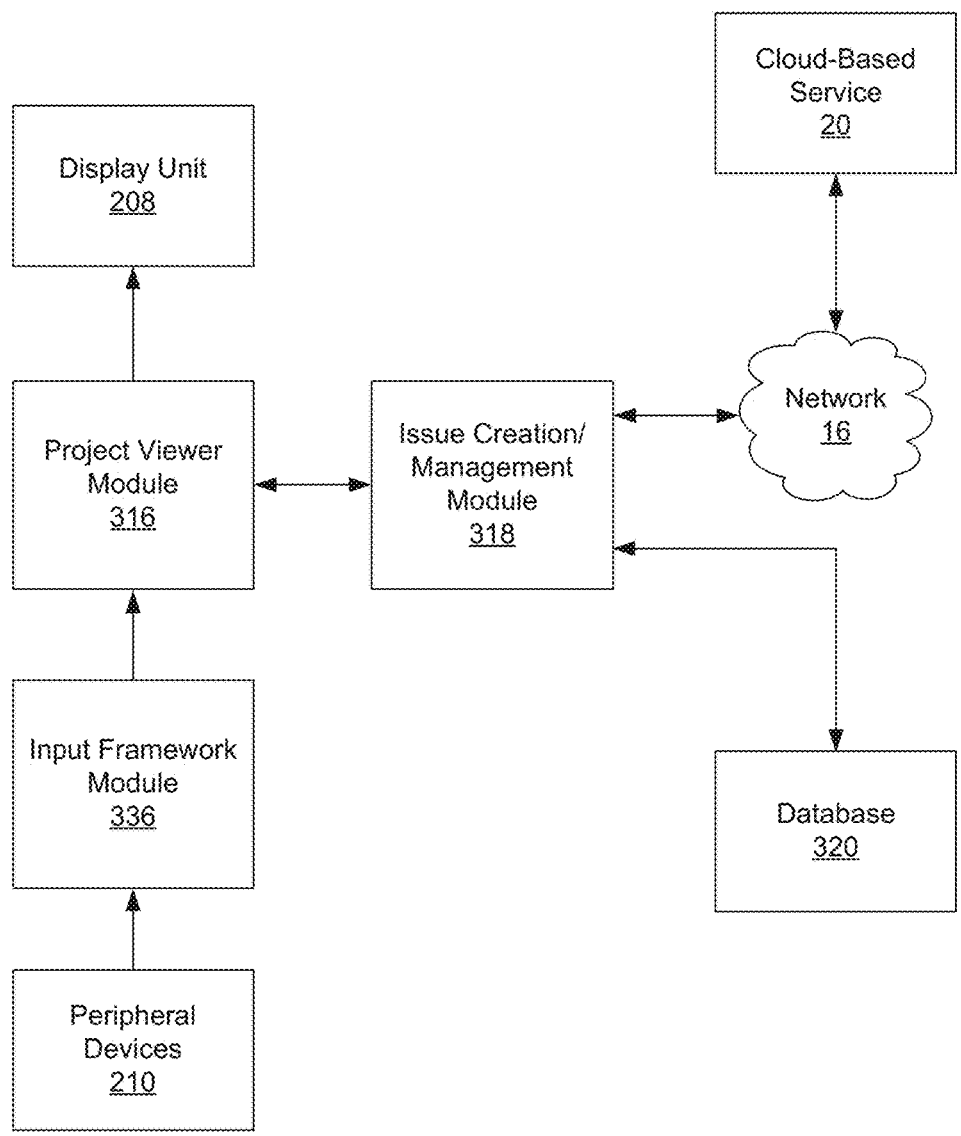
FIG. 5 is a block diagram illustrating another portion of the field management system of FIG. 3.

FIG. 5 is a block diagram illustrating the project viewer module 316 and the issue creation and management module 318 of the field management system 300 of FIG. 3 in greater detail. As previously described, in some instances, a user in the field (e.g., at a construction site) may be performing one or more project management processes and may need to document problems or issues with the construction site. For example, a project coordinator, such as a foreman, may walk through a building under construction so as to ensure that the building is being constructed as intended and, during such walk through, may identify issues that require attention and need to be resolved before the building is considered complete. Furthermore, field personnel may need to review the plans, including any issues that the foreman found, during construction so as to ensure that the task with which they are responsible (e.g., plumber installing piping system) is being carried out as planned in accordance with the building model. As described in greater detail herein, the issue creation and management module 318 is configured to allow a user to interact with a project rendering (e.g., building plan) in the field and create one or more fully-featured, easy-to-identify, and highly legible issue mark-ups on the building plan. The issue mark-ups include informative data that provide a responsible party, such as a plumber or other worker, with details to understand, evaluate, and resolve the issue in a timely manner. An issue mark-up may generally be understood to refer to an indication that makes note of, highlights, or otherwise calls out a problem, issue or concern and/or any changes or revisions that may require resolution or correction. The marked up building plan may be stored in the cloud-based service 20 to share with other users on their respective mobile devices, thereby allowing other distributed users to view issue mark-ups of the building plan.

It should be noted that the issue creation and management systems and methods of the present disclosure may be used concurrently and in conjunction with a variety of field management services, such as the commissioning process, as previously described herein, the field inspection process or quality control process, as to ensure the project is being, or has been, completed according to plans and as intended and to address any safety issues. As such, the issue creation and management module 318 may carry out processes with any one of the other modules 302-316.

Figure 6:
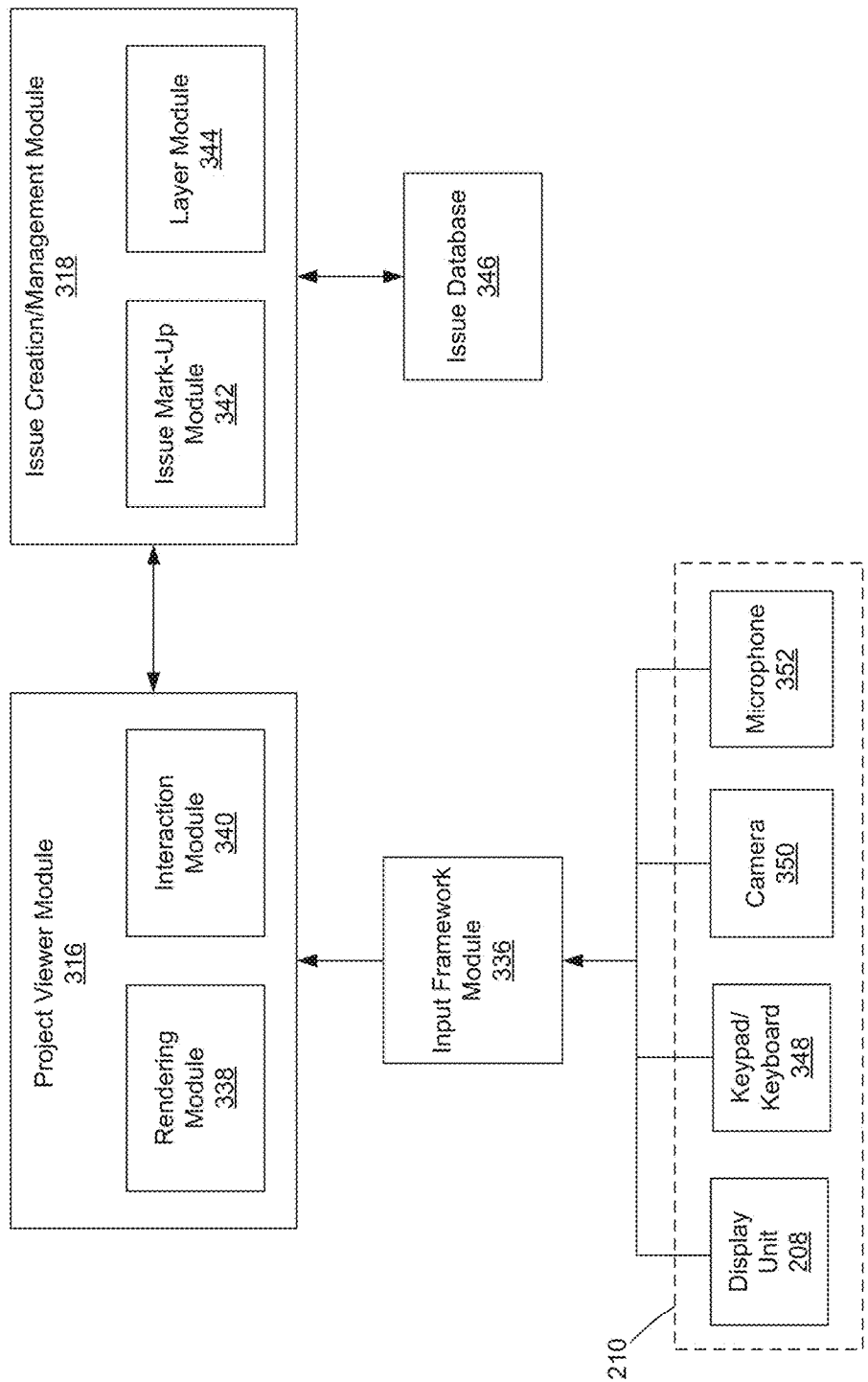
FIG. 6 is a block diagram illustrating the issue creation and management module of FIG. 5 in greater detail.

The system includes a project viewer module 316 configured to display a project rendering (e.g., drawing, blueprint, building information model (BIM), project related documents, etc.) for display on the display unit 208 of the mobile device 14 and further allow user interaction with the project rendering. For ease of explanation in the following description, the project rendering is a building plan. In particular, as shown in FIG. 6, the project viewer module 16 includes a rendering module 338 and an interaction module 340. The rendering module 332 is configured to receive project data, such as a building plan file, and further render a building plan from such data. The rendering module 338 may include custom, proprietary, known and/or after-developed data and graphics code (or instruction sets, functions, etc.) that are generally well-defined and operable to receive any type of data (e.g., graphic, text, image, audio, etc.) or file format (e.g., PDF, DOC, GIF, JPEG, MPEG, etc.) and generate an interactive rendering of the data for output to a display 208. For example, the rendering module 338 may include a graphics processing unit (GPU) or similar hardware.

The project data may be in the form of a building plan file stored locally on the mobile device 14 (e.g., stored in database 320) and compatible with the current operating system (OS) and/or project management software running on the mobile device 14. It should also be noted that the rendering module 338 is configured to receive project data from an existing design program, for example. The rendering module 338 may be configured to receive, process, and transform the project data into a format that is compatible with project management systems consistent with the present disclosure. Accordingly, the project viewer module 316 is compatible with other existing building design programs and solutions and is therefore not limited to the type of project data that can be received and rendered. The rendering module 338 is further configured to provide a visual rendering of project data, such as the building plan, of the transformed project data on the display 208 of the mobile device 14. Additionally, or alternatively, the project viewer module 316 may be configured to receive project data and files from the cloud-based service 20, for example.

Upon generating a building plan from the project data, the rendering module 338 is configured to output the building plan to the display unit 208 of the mobile device 14 to further allow user interaction with the building plan. The interaction module 340 is configured to allow a user 12 of the mobile device 14 manipulate and work directly with the displayed building plan by way of user input. The user input may be in the form of user commands from the one or more peripheral devices 210 (e.g., touch-based input on the display, keypad/board commands, image data, audio data, etc.). The peripheral devices 210 may, in turn, provide user input to an input framework module 336. The input framework module 336 may include custom, proprietary, known and/or after-developed code (or instruction sets) that are generally well-defined and operable to receive the user input and further determine the type of input (e.g., touch input, image, audio, etc.). The interaction module 340 is configure to receive user input from the input framework module 336 and further identify user commands associated with the user input for the manipulation of the displayed building plan.

For example, as shown in FIG. 6, the interaction module 340 is configured to receive user input from one or more peripheral devices 210, such as, for example, a touch-screen display 208, a keypad/keyboard 348, a camera 350, and/or a microphone 352. In response to user input, the interaction module 340 is configured to allow a user to interact and work directly with the displayed building plan via an issue creation and management interface provided by the issue creation/management module 318, described in greater detail herein.

The interaction module 340 may be configured to identify one or more touch events based on received touch input from the input framework module 336. For example, the interaction module 340 may be configured to identify the touch type and/or touch location(s) on the touch-sensitive display 208. Touch type may include a single tap, a double tap, a tap and hold, a tap and move, a pinch and stretch, a swipe, etc., to the touch-sensitive display 208. Touch location(s) may include a touch start location, a touch end location and/or intermediate moving touch locations, etc., of the touch-sensitive display 208. The touch locations may correspond to coordinates of touch-sensitive display 208. Accordingly, the interaction module 340 may include custom, proprietary, known and/or after-developed touch detection code (or instruction sets) that are generally well-defined and operable to receive touch data and to identify a touch event. In turn, the rendering module 338 may be configured to reconfigure one or more parameters of the building plan in response to the user input.

Figure 7:
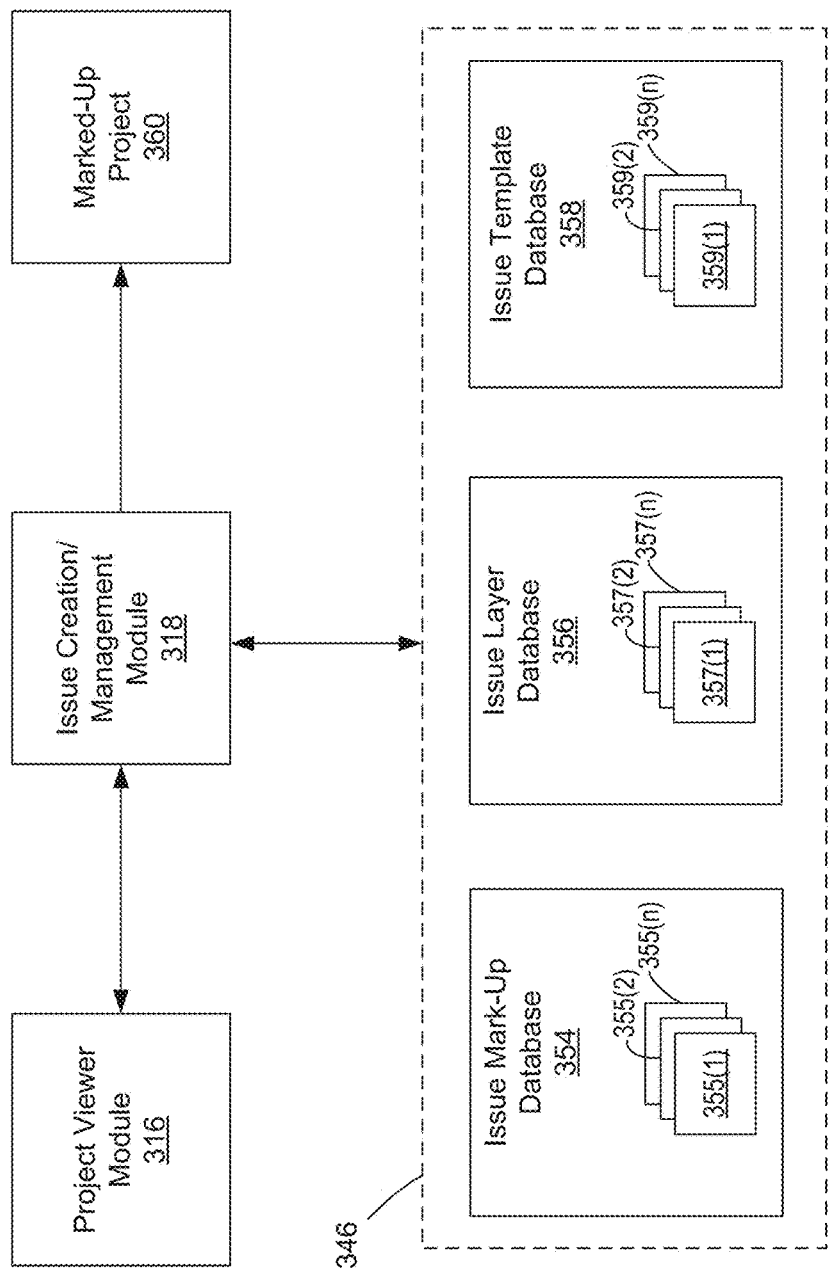
FIG. 7 is a block diagram illustrating the issue creation and management module of FIG. 5 in greater detail.

In one embodiment, the display unit 208 may be a touchscreen display, such that a user 12 may interact with the displayed building plan via the display 208, which may include a graphical user interface (GUI) including one or more tools for manipulating the building plan. For example, the issue creation/management module 318 is configured to communicate with the project viewer module 316 and provide an issue creation interface, allowing the user to create issue mark-ups on the building plan. The issue creation and management module 318 includes an issue mark-up module 342 and a layer module 344. The issue mark-up module 342 is configured to allow a user to create one or more issue mark-ups on the displayed building plan via user interaction with the interface on the display. The layer module 344 is configured to ensure that each created issue mark-up is stored as a separate layer of the building plan. Accordingly, a user may create multiple issue mark-ups on a single building plan, with each issue mark-up being stored in a separate associated layer of the building plan. The created issue mark-ups and associated layers may be stored in the issue database 346, for example. As shown in FIG. 7, the issue database 346 includes an issue layer database 356 including layer profiles 357(1)-357(n), which may be helpful in the filtering and sorting of issue mark-ups, described in greater detail herein. The issue database 346 may be within the cloud-based service 20. Additionally, or alternatively, the issue database 346 may be included within the local database 320.

The issue creation and management interface provides the user with a variety of tools or options when creating and managing the issue mark-ups. The interface may provide a user with the ability to manipulate one or more elements of the building plan on the fly, such as the type of view (e.g., bird's eye, side, sectional, magnified, etc.). The interface may further allow the user to select specific areas on the building plan in which to include an issue mark-up and further input informative data associated with the issue mark-up. Informative data may include, but is not limited to, issue type, the defined area of the building in which the issue can be found, a description of the issue, an identified party responsible for addressing and resolving the issue, and issue status. The informative data may be included within an issue mark-up database 354 of the issue database 346, for example.

Additionally, the interface may allow a user to include user input data provided on the building drawing and included with the issue mark-up so as to provide greater detail regarding the issue. The user input data may include, for example, annotations, such as an arrow pointing to the issue, a circle, square, line, cloud bubble, push-pin, text, photo mark-up icon, or any combination thereof. The user input data may also include images (e.g., captured by the camera 340) and/or voice recordings (e.g., captured by the microphone 342) which may provide additional details regarding the issue.

In one embodiment, the issue creation and management interface provides a user with a list of customizable standard issue templates 359(1)-359(n) from an issue template database 358. The templates 359 represent issues or problems most often encountered on the job site, and further contain pre-defined informative data, such as issue descriptions and responsible parties. Accordingly, rather than manually create most, if not all, of the issue mark-ups, a user need only select and drag an appropriate standard issue template 359 from the list and drop the template on the location of the building plan of the actual issue so as to create an issue mark-up at a selected location on the drawing. In turn, the issue creation and management module 318 is configured to automatically create an issue mark-up at the selected area on the building plan and further include the informative data associated with the selected issue template. The user may then include additional data, such as annotations on the drawing. Furthermore, the user may attach an image associated with the issue mark-up, such as an image of the real-world component, system, structure, etc. that requires fixing.

Upon creating issue mark-ups on the building plan, the issue creation/management module 318 is configured to save and store the marked-up project 360 (e.g., building plan). The marked-up building plan 360 may be stored locally (i.e., within database 320) and/or on the cloud-based service 20. The marked-up building plan 360 may generally include a set of relationships in the database that connects individual markups to a particular project drawing, all of the issue mark-ups and associated layers (or any selected subset), as well as the associated informative data included therewith. Upon storing in the cloud-based service 20, for example, the marked-up building plan may be shared with other users on their respective mobile devices, thereby allowing other distributed users to view issue mark-ups of the building plan.

Figure 8:
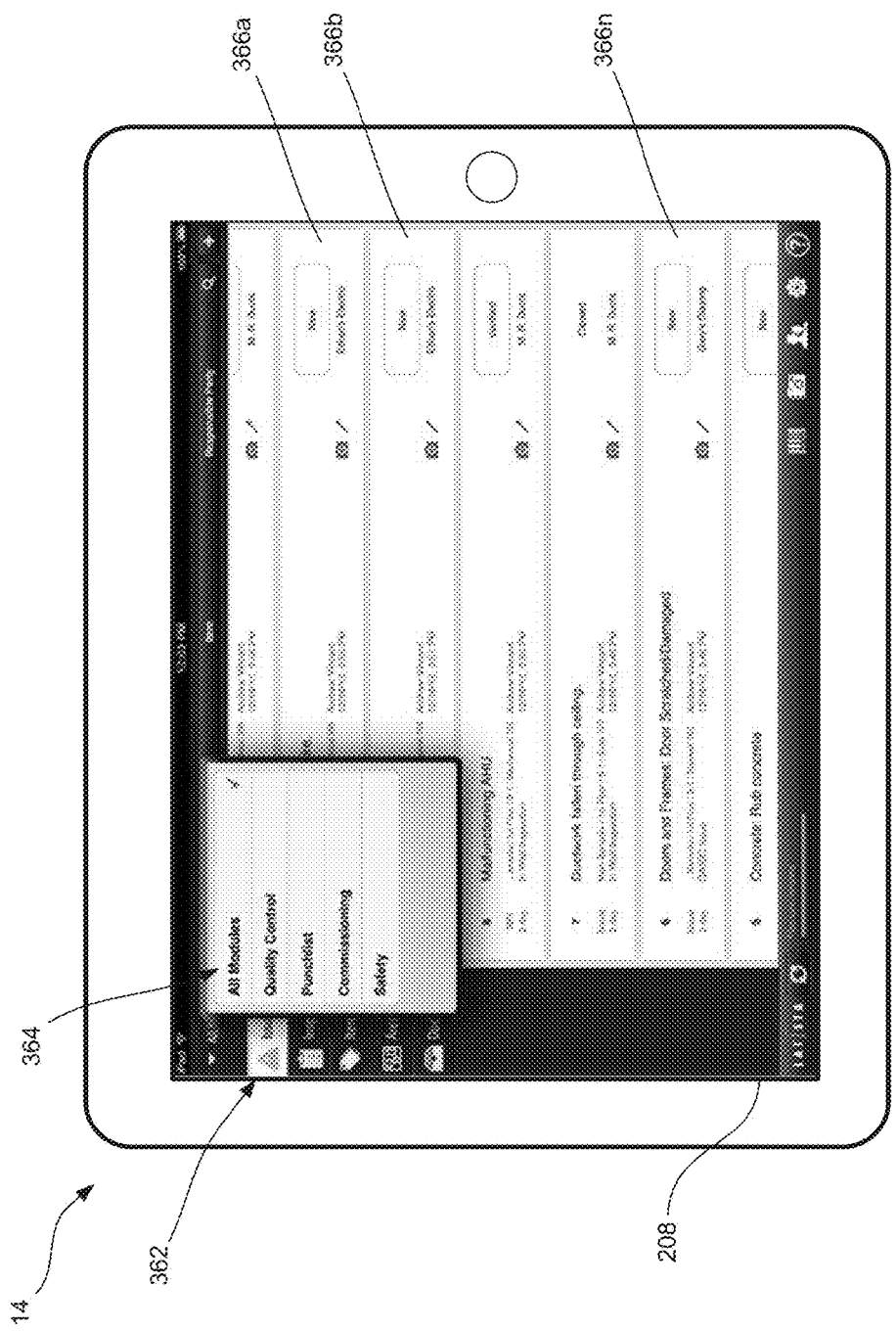
FIG. 8 illustrates the presentation of an issue creation and management interface on a display of a mobile device consistent with the present disclosure.

FIG. 8 illustrates the presentation of an issue creation and management interface 362 on a touchscreen display 208 of a mobile device 14 consistent with the present disclosure. As shown, the interface 362 may provide a variety of tools or options, such as a drop down menu 364, from which the user may select so as to effectively sort and filter records of created issues associated with issue mark-ups of a building plan (shown in FIG. 9). In one embodiment, the interface 362 may visually provide the user with a list of the issue records 366a-366n for each issue mark-up. As shown, each issue record includes informative data, such as an issue number, an option standard issue short-code or abbreviation, the specific item or component requiring repair, a brief description of the issue, the responsible party, the current status of the issue (e.g., open, closed, in progress), the date the issue was created, the date the issue was closed, as well as any attached images. The interface 362 may further provide tools for sorting or filtering informative data of the issue records, so as to arrange the issue records in a desired pattern.

Figure 9:
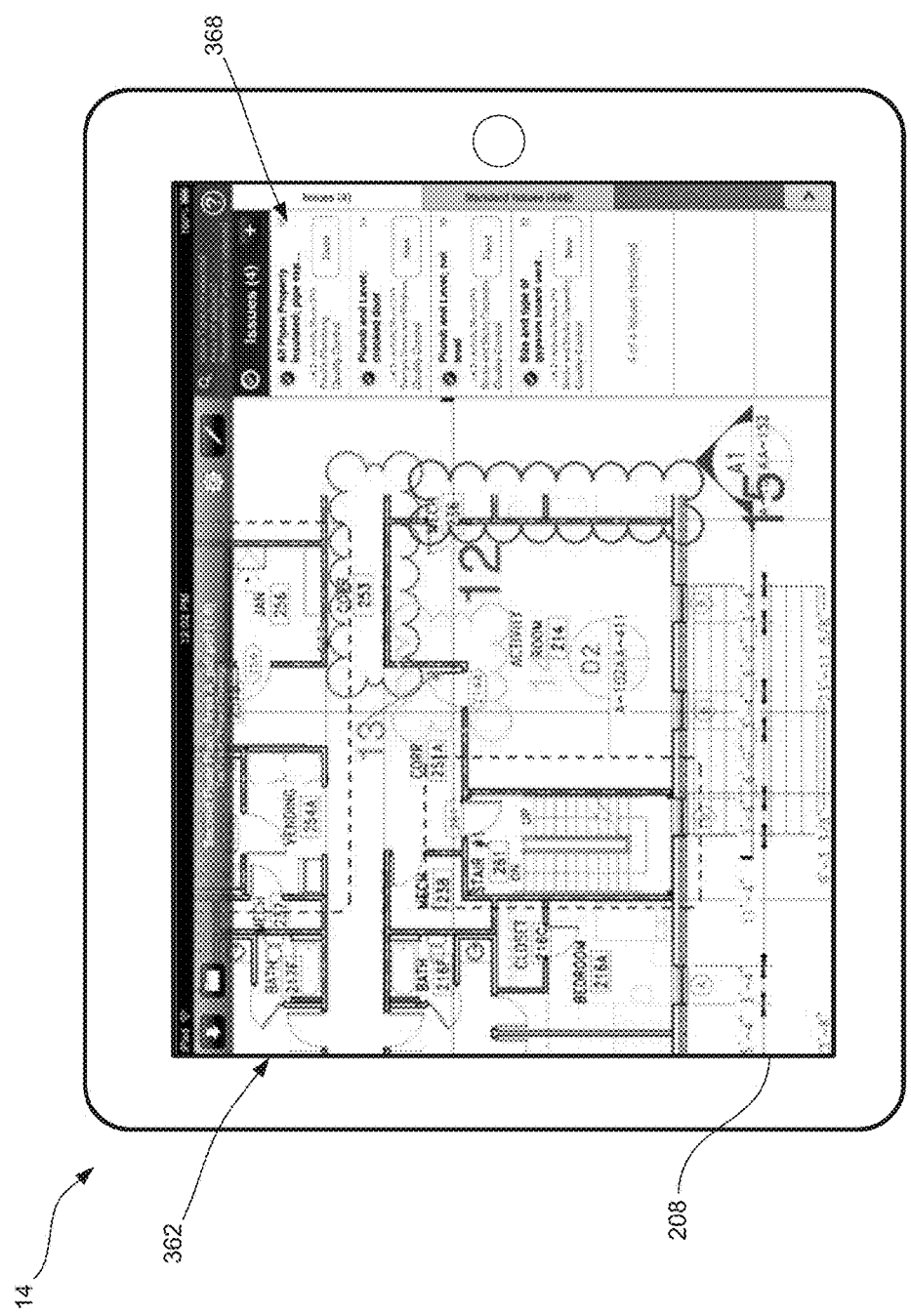
FIGS. 9 and 10 illustrate the presentation of a building plan a variety of different issue mark-ups as provided by the issue creation and management interface of FIG. 8.
Figure 10:
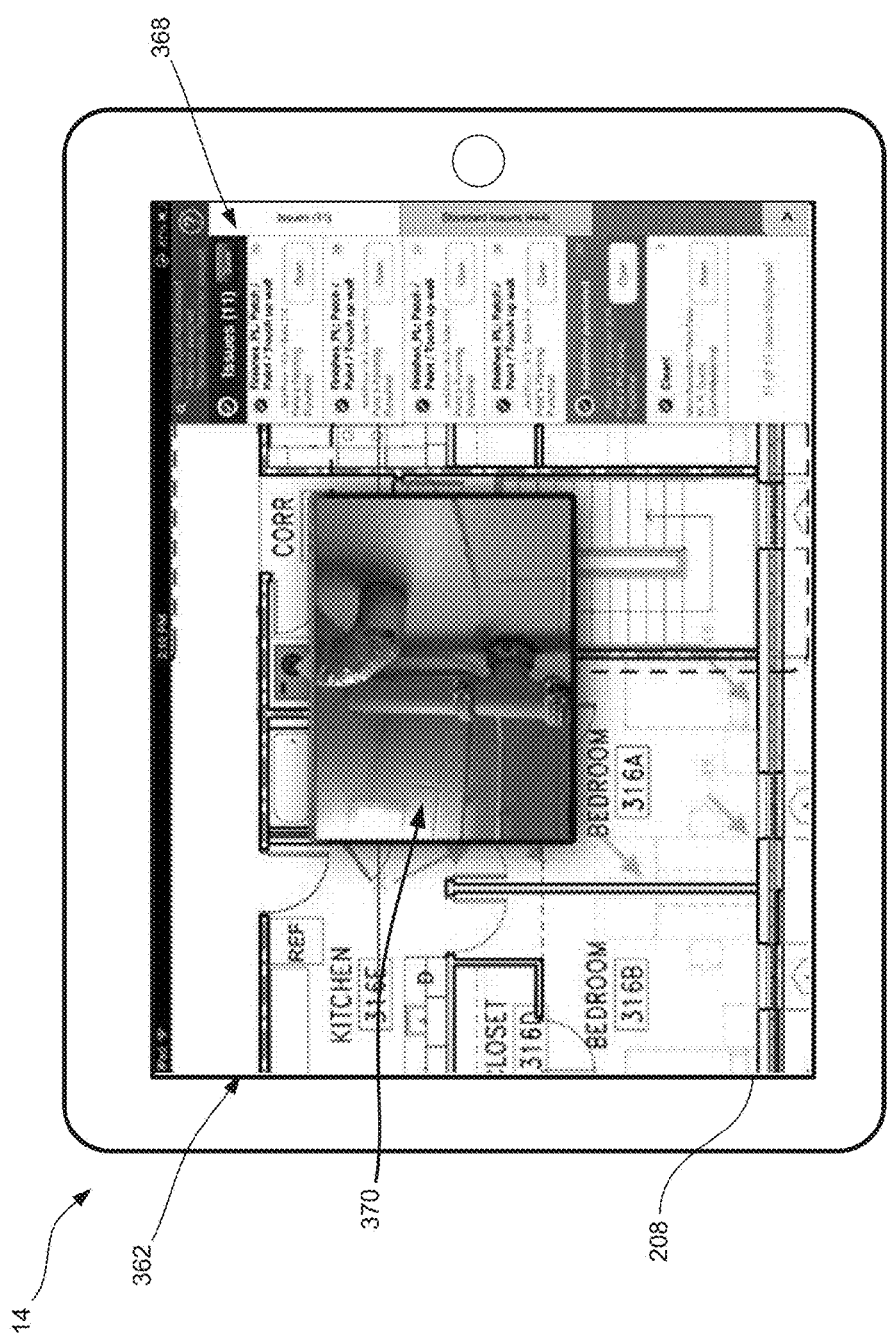

FIG. 9 illustrates the presentation of building plan provided by the issue creation and management interface 362 of FIG. 8. As shown, the interface 362 provides a dropdown list 368 of issue records from the issue markup database 354 (e.g., given the identifier numbers 12-15 by the issue management module 318) which, if opened, show the associated issue mark-up on the building plan, including associated annotations (e.g., cloud bubbles) drawn directly on the building plan at the sites of the issues. As previously described, because each issue mark-up is stored as an independent layer (e.g., in the issue markup database 354 in the layers 355(1)-355(n)), the interface 362 allows a user to filter the view of the building plan such that only desired issue mark-ups are displayed. In this instance, only issue records 12-15 are selected and the associated issue mark-ups (cloud bubbles 12-15) are displayed on the building plan. As shown in FIG. 10, the user selected a specific issue record from the dropdown list 368 (e.g., highlighted issue record), wherein the associated issue mark-up includes an image 370 attached thereto, wherein the image depicts a real-world configuration of an item that requires fixing or the like. Accordingly, the interface 362 allows selection of a single issue record to reveal the associated issue mark-up, while the remaining issue mark-ups are hidden from view.

As previously described, any issue mark-up that has been created may be subject to a pre-defined workflow specific to the issue's type or category. The systems are configured to allow a user to customize the issue process by defining a custom list of statuses that the issue will flow through and transitions that will move an issue from one status to the next. For example, in the event that there is a plumbing issue (e.g., incorrect pipe component installed), as indicated by issue mark-up of FIG. 9, for example, the responsible party (e.g., plumber) may have access to the building plan including the specific issue mark-up. Accordingly, the plumber is able to access and interact with the marked-up building plan from the cloud-based service 20 via their mobile device 14 while in the field and review the issue mark-up to which they are assigned as the responsible party. The workflow may be similar to the user—defined workflow as previously described regarding FIG. 4, such that, the before a particular step of any particular construction project (e.g., system install) can be started, the issue mark-up must be resolved. Accordingly, the system allows generation of a user-defined process-driven workflow. This ensures that issues are moved through the workflow in an orderly and efficient fashion, that all steps and involved parties are documented accurately, and that no issue is missed, saving projects time and money while reducing the risk of safety violations and poor construction.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

The functionality of the system provides flexible review of markups. For instance, the system accepts selection of and generates visual display of the project drawing with any selected set of issues and their associated markups. The selection and display may be responsive to one or multiple parameters such as issue status, issue category, work performed or to be performed, inspecting area, responsible parties, issue location, severity, time or date, or other parameters.

Further, the system may independently establish permission levels for different users. For instance, the system may set any combination of read, write, and modify access to issues for specific users and user groups. The users may then, according to the permissions, display visually on a plan, schema or drawing a set of issues permitted for those particular users or user groups to access. For instance, a user group dealing with plumbing issues may have read access only to issues tagged as related to plumbing.

In one aspect, the system produces, interactively, a paper-based document or an electronic document using any technology to depict graphical images in any form (e.g., JPG, PDF, BMP or TIFF). The images may comprise a plan, schema or drawing of the project with one or more issues selected as noted above, or according to any other issue filter or search parameters. The system may create electronic documents periodically, manually (e.g., responsive to a user input), or automatically on any desired interval (e.g., once a day, a week, or a month). The system may store the electronic documents in the issue database or in any other electronic file repository to preserve current state of the project at a particular moment of time.

The system is further configured to create additional visual markups to existing issues during the work flow process of managing the issue. This may allow for enhancement of the information available for known issues. This may also allow visual communications between multiple parties involved in the project management process. In more detail, the system may create additional visual markups. The additional markups may be, for instance, a photo of the inspecting object or additional drawing. The additional markup may thereby document the state when issue is resolved to the satisfaction of the client or parties involved in the project management process.

The methods, modules, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible. Each component or system may include additional, different, or fewer components than described in the examples given above.

What is claimed is:

1. A computing system comprising:
a processor connected to memory; and
a module stored on a non-transitory computer readable medium and configured with instructions that when executed by the processor cause the processor to:
receive, through a communication interface over a computer network, a template selection from a mobile device for a field inspection;
query an issue template database to retrieve a selected field inspection issue template from the issue template database corresponding to the template selection;
transmit the selected field inspection issue template through the communication interface over the computer network to the mobile device;
receive, from the mobile device through the communication interface over the computer network, an issue markup corresponding to the selected field inspection issue template, the issue markup corresponding to a particular project drawing under inspection during the field inspection;
store, within a cloud computing environment for synchronization over the computing network with a plurality of mobile devices, the issue markup as a separate layer of the project drawing within an electronic data file comprising a set of separate layers corresponding to separate issue markups for the project drawing;
receive a filter parameter corresponding to at least one of a video annotation type or a voice annotation type;
filter the issue markups using the filter parameter to identify a subset of issue markups; and
transmit the subset of issue markups through the communication interface over the computer network to the mobile device for display.

2. The computing system of claim 1, wherein the instructions cause the processor to:
retrieve each of multiple issue markups from each layer for the project drawing.

3. The computing system of claim 1, wherein the filter parameter comprises an image annotation type.

4. The computing system of claim 2, wherein the instructions cause the processor to:
create a marked-up project comprising the project drawing and the issue markups.

5. The computing system of claim 4, wherein the instructions cause the processor to:
assign an issue record identifier to each of the multiple issue markups.

6. The computing system of claim 1, wherein the instructions cause the processor to:
assign a pre-defined workflow to the issue markup, the pre-defined workflow specific to an issue identified by the issue markup.

7. The computing system of claim 1, wherein the filter parameter comprises at least one of an issue severity, an issue duration, an issue status, or a responsible party.

8. The system of claim 4, wherein the instructions cause the processor to:
communicate the marked-up project through the communication interface over the computer network to the cloud storage system.

9. A method comprising:
receiving, through a communication interface by a processor over a computer network, a template selection from a mobile device for a field inspection;
querying, by the processor, an issue template database to retrieve a selected field inspection issue template from the issue template database corresponding to the template selection;
transmitting, by the processor, the selected field inspection issue template through the communication interface to the mobile device over the computer network;
receiving, from the mobile device through the communication interface by the processor over the computer network, an issue markup corresponding to the selected field inspection issue template, the issue markup also corresponding to the project drawing under inspection during the field inspection;
storing, by the processor within a cloud computing environment for synchronization over the computing network with a plurality of mobile devices, the issue markup as a specific layer among the layers of the project drawing within an electronic data file comprising a set of separate layers corresponding to separate issue markups for the project drawing;
receiving, by the processor, a filter parameter corresponding to at least one of a video annotation type or a voice annotation type;
filtering, by the processor, the issue markups using the filter parameter to identify a subset of issue markups; and
transmitting, by the processor, the subset of issue markups through the communication interface over the computer network to the mobile device for display.

10. The method of claim 9, further comprising:
establishing multiple separate layers for the project drawing, each corresponding to a separate issue markup for the project drawing.

11. The method of claim 9, further comprising:
creating a marked-up project comprising the project drawing and the issue markup.

12. The method of claim 9, further comprising:
retrieving each of multiple issue markups from each layer for the project drawing; and
creating a marked-up project comprising the project drawing the issue markups.

13. The method of claim 12, further comprising assigning an issue record identifier to each of the multiple issue markups.

14. The method of claim 9, further comprising:
assigning a pre-defined workflow to the issue markup, the pre-defined workflow specific to an issue identified by the issue markup.

15. The method of claim 14, where the pre-defined workflow comprises:
a list of statuses that the issue will flow through; and
transitions that move the issue between statuses of the list of statuses.

16. The method of claim 11, further comprising:
communicating the marked-up project through the communication interface to the cloud storage system over the computer network.

17. A non-transitory computer-readable medium storing computer-executable instructions that when executed by a processor of a computer causes the processor to:
receive, through a communication interface over a computer network, a project model for use in a field inspection of a project;
render the project model on an electronic display of the computer as a project drawing;
receive, through an input interface, a selection for an issue template available for the project drawing;
receive, through the input interface, issue markup for the project drawing and according to the issue template;
store, within a cloud computing environment for synchronization over the computing network with a plurality of mobile devices, the issue markup as a separate layer of the project drawing within an electronic data file comprising a set of separate layers corresponding to separate issue markups for the project drawing
receive a filter parameter corresponding to at least one of a video annotation type or a voice annotation type;
filter the issue markups using the filter parameter to identify a subset of issue markups; and
transmit the subset of issue markups through the communication interface over the computer network to the mobile device for display.

18. The non-transitory computer-readable medium of claim 17, wherein the instructions comprise instructions to:
assign a pre-defined workflow to the issue markup, the pre-defined workflow specific to an issue identified by the issue markup.

19. The non-transitory computer-readable medium of claim 17, wherein the instructions comprise instructions to:
receive, through the input interface, an issue markup selection;
retrieve the issue markups corresponding to the issue markup selection from the set of layers of the project drawing; and
display the issue markups on the project drawing on the display.

20. The non-transitory computer-readable medium of claim 17, wherein the instructions comprise instructions to:
render the issue markups on the project drawing.

* * * * *